Patented Aug. 8, 1950

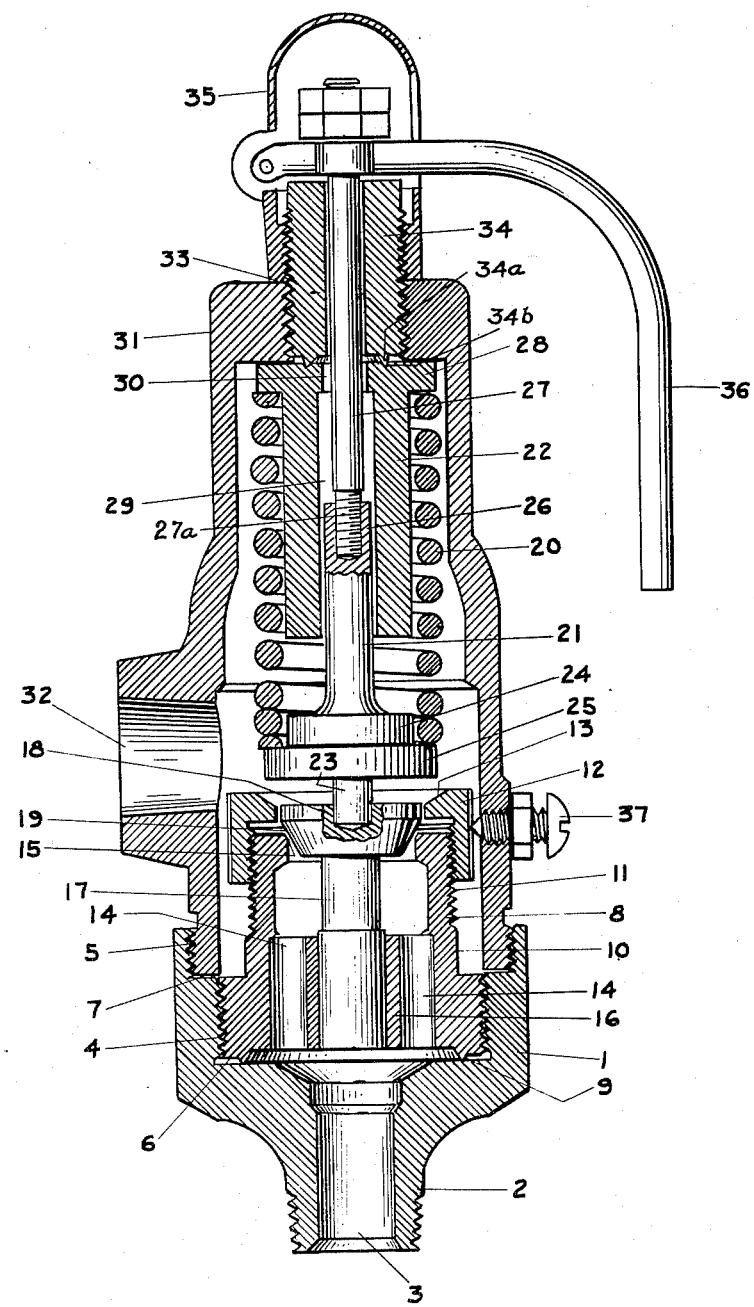

2,517,562

UNITED STATES PATENT OFFICE 2,517,562

RELIEF VALVE

Ray F. Hanson, Vallejo, Calif.

Application July 21, 1945, Serial No. 606,467

1 Claim. (Cl. 137—53)

(Granted under the act of March 3, 1883, as amended April 30, 1928; 370 O. G. 757)

This invention relates to relief valves and more particularly to automatic pressure relief valves for liquid and gaseous fluids.

Objects of my invention are to provide an improved relief valve of sturdy and rugged construction capable of withstanding the normal hazards incident to the handling and operation of the valve; to provide a protective bonnet so mounted as to insulate the operating parts of the valve from external damaging influences; and to provide a valve construction having the characteristics mentioned above that may be used in existing types of valves and operated by existing types of controls.

In accomplishing these and other objects of the present invention, I have provided improved details of structure, the preferred form of which is illustrated in the accompanying drawing, wherein the figure is a vertical cross sectional view of my improved relief valve embodying the features of the present invention.

Referring more in detail to the drawing:

The relief valve of the present invention comprises a base element designated generally as 1 of a material suitable for mounting and supporting the rest of the valve assembly. The upper portion of the base element is substantially cylindrical in shape tapering off to an externally screw threaded support portion 2 of reduced diameter at the lower portion of the base element.

A valve inlet 3 is provided in the base element 1 through which liquid and gaseous fluids are permitted entrance to the valve.

On the upwardly disposed surface of the base 1, mounting means are provided for securing other portions of the valve to the base 1. The mounting means include inner and outer screw-threaded seats 4 and 5 preferably concentrically arranged and disposed in spaced relation.

Annular sealing surfaces 6 and 7 within the couplings 4 and 5 respectively provide seating means against which the valve parts may be tightened for sealing purposes.

Screw-threadedly engaged with the valve base 1 in the inner seat 4 is a valve seat insert element 8. On the lower portion of the insert 8 a downwardly disposed circular knife edge 9 is provided to engage the annular sealing surface 6 to form a substantially fluid tight seal between the insert 8 and the base 1.

To facilitate the tightening rotation of the insert 8 to force the knife edge 9 against the sealing surface 6, a circumscribing series of flattened surfaces 10, constituting wrench faces, are formed in the external portion of the central part of the insert 8.

A threaded portion 11 is provided on the upper extremity of the insert 8.

A blow back ring 12 is screw-threadedly engaged with the threaded portion 11 and is vertically adjustable in relation to the insert 8. The blow back ring 12 is provided to cause audible signals to be emitted to attract attention when the relief valve opens. The blow back ring 12 has an inwardly extended annular lip 13 to constrict the opening in said ring 12. When the blow back ring 12 is positioned against the top of the insert, it is sufficiently out of the path of the discharging fluid to have no audible effect. Increasing the distance between the lip and the insert causes the lip to enter the fluid stream. The greater the distance between the lip and the insert the greater is the reaction on the discharging fluid and the resultant discharge signal.

Communicating with the valve inlet 3 are pressure relief passages 14 provided in the insert 8 that terminate in an outlet opening in the upper portion of the insert 8. A bevelled annular valve seat 15 is formed in the insert 8 circumscribing the insert outlet opening.

A valve stem guide 16 is made integral with the insert 8 and is adapted to position a valve body by embracing its valve stem 17 in a vertically slidable relationship.

The valve stem 17 of the valve body terminates at its upper extremity in a valve head 18 arranged in spaced relation to the blow back ring 12 and cooperatively engaging the valve seat 15 by means of a valve face 19 on said valve head, to seal the valve.

The valve head 18 has a socket in its upper surface to receive a spring guide pin 23 provided to maintain the valve body in a closed position until a desired fluid discharge pressure is reached.

The spring is provided with a guide 21, and a spring retainer 22. The spring guide 21 has a depending pin 23 to be received by the valve head socket to center the spring and to transmit the spring pressure to the valve head to close the valve. Two outwardly extended coaxial disks, 24 and 25 are also provided on the guide 21, the upper disk 24 being of lesser diameter to engage the spring on its inner peripheral surface and center it, the lower disk 25 being of a greater diameter to serve as a spring base. An upwardly extended guide portion 26 slidably engages the retainer 22 and secures a connecting rod 27 to the guide. The connecting rod 27 and the guide portion 26 are attached together by means of a screw-threaded joint 27a, formed of a male threaded end portion on the connecting rod 27 engaging an internally threaded end opening in the guide portion 26.

The spring 20 is a conventional resilient type of helical shape.

The retainer 22 is provided with a depending cylindrical portion fitting within the spring 20, an upper annular flange 28 to provide an upper bearing surface for the spring, a bore 29 to slidably receive the upward extension of the guide 21 and an opening 30 to pass the connecting rod 23.

A protective envelope, called a bonnet 31, to inclose the working parts of the relief valve, is mounted on the base in the outer upper seat 5. By mounting the bonnet 31 directly on the base 1 instead of on the insert 8 as is the conventional practice, damaging blows against the bonnet 31 are transmitted to the base 1 instead of to the more delicate insert 8. In addition, this mounting means permits the tightening of the bonnet 31 without distorting the insert 8 or the valve seat 15. The bonnet 31 is made of a material to form a protective shield for the inner working parts of the valve.

An opening 32 in the bonnet is provided as an outlet for the discharge of the fluid from the valve.

A threaded opening 33 is formed in the upper portion of the bonnet 31 in alignment with the spring means. A threaded bushing 34 is adjustably mounted therein and bears against the upper surface of the spring retainer 22 to adjust the spring pressure as desired. The bushing 34 has a cylindrical bore to permit the connecting rod 27 to be slidably engaged therein. The bushing 34 is also provided with a circular tongue 34a, for example in the form of a knife-edge, which engages a circular groove 34b of mating cross-section provided in the flange 28. This arrangement serves to centralize the spring retainer 22 and prevent it from being inadvertently displaced which would cause distortion of the spring 20.

A threaded cap 35 is provided to screw down on the exposed threads of the bushing 34 to lock it in adjusted position.

Pivotally mounted in the cap 35 is a hand release lever 36 engaged with the connecting rod 27 which in turn is threadedly secured to the valve guide 21 to provide a mechanical linkage for manually compressing the valve spring to permit the valve to open and release the fluid pressure.

A set screw 37 is mounted in the bonnet 31 adjacent the blow back ring 12 to lock the latter in adjusted position.

Operation

The operation of a relief valve constructed as described is as follows:

To operate the relief valve as an automatic signaling device, the blow back ring 12 is rotated to move it upwardly or downwardly to the desired position and locked there by the set screw 37.

The bushing 34 is rotated to the point providing the spring pressure on the valve head 18 that is desired. This establishes the "pop-off" pressure for the valve. The cap 35 is then tightened into position to lock the bushing 34.

As the fluid pressure increases the valve is maintained in a sealed condition by the spring means. As the "pop-off" pressure is exceeded the pressure of the spring means is overcome by the fluid pressure and the valve body is thrust upward, breaking the seal, and releasing the fluid.

The distance that the valve head 18 has to travel to open the valve is dependent upon the positioning of the blow back ring 12. The farther and the more violently that the valve 18 moves, the more energy there is used in the production of the audible signal and the louder it is.

The valve head 18 remains in open position until the fluid pressure has been relieved and becomes less than the spring pressure on the valve head. At that point the spring pressure returns the valve body to seated position to seal the valve.

The operation of the relief valve without the audible signal is accomplished in the same manner except that the blow back ring lip 13 is maintained in a position against the insert 8, out of the discharging fluid stream.

The manual discharge of the fluid pressure is accomplished by raising the release handle 36 which in turn lifts the connecting rod 27 and the spring guide 21 to compress the valve spring 20 permitting the valve body to move upwardly and release the fluid pressure.

The improved relief valve of this invention, because of its rugged construction, and by reason of its having the insert 8 and parts supported thereby mounted independently of the bonnet 31 on the base 1, and having the bonnet 31 mounted so as to transmit no mounting or operational stresses or strains born thereby to the inner operational parts of the valve, has been found ideally suited to valve relief purposes.

While I have shown but one embodiment of my invention, it is susceptible to modification without departing from the spirit of the invention. I do not wish, therefore, to be limited by the disclosures set forth, but only by the scope of the appended claim.

The invention described herein may be manufactured by or for the Government of the United States of America for governmental purposes without the payment of any royalties thereon or therefor.

I claim:

A relief valve comprising a base member having a support portion, a valve inlet and a pair of upwardly disposed concentric seats; a valve seat insert element mounted in the lower base seat having a circular knife edge downwardly disposed to engage the valve base member in a substantially fluid tight manner, a blow back ring mounted on and adjustable relative to the insert element to provide an audible signal responsive to valve pressure release, said insert element having an insert element discharge opening, a bevelled annular valve seat circumscribing said insert element discharge opening, means providing pressure relief passages communicating with the valve inlet and the insert element discharge opening, a valve stem guide integral with the insert, a valve body having a head portion and having a stem portion vertically slidably mounted in the stem guide, an annular bevelled valve face on the valve head cooperable with the valve seat to seal the valve at reduced fluid pressures, and a socket in the upper surface of the valve head to position a valve spring guide; means for applying controlled pressure to the valve head to regulate the pressure at which the valve releases, comprising a valve spring guide positioned on the valve head, a valve spring guided by the guide and a valve spring retainer employed to position the upper part of the valve spring; a bonnet mounted in the upper seat of the base member, a discharge opening in the bonnet, a set screw provided in the bonnet to engage the blow back ring and maintain it in an adjusted position, said bonnet having an opening at the upper extremity thereof, and an adjustment bushing mounted in the bonnet having a tongue and groove centralizing contact with the upper surface of the spring retainer to regulate spring pressure on the valve by rotating the bushing; a release handle pivotally supported above the bonnet and a connecting rod pivotally secured to the release handle passing through openings in the bushing and the valve spring retainer and secured to the valve spring guide to provide a mechanical linkage between the release handle and the valve spring guide for compressing the valve spring and manually releasing the impounded fluid.

RAY F. HANSON.

REFERENCES CITED

The following references are of record in the file of this patent:

UNITED STATES PATENTS

| Number | Name | Date |
| --- | --- | --- |
| 103,062 | Lynde | May 17, 1870 |
| 455,476 | Scott | July 7, 1891 |
| 525,963 | McNeil et al. | Sept. 11, 1894 |
| 953,052 | McCarty | Mar. 29, 1910 |
| 1,668,453 | Graesser | May 1, 1928 |
| 2,098,399 | Munson | Nov. 9, 1937 |
| 2,124,374 | Mulloy | July 19, 1938 |